United States Patent [19]

Speicher et al.

[11] Patent Number: 5,795,261

[45] Date of Patent: Aug. 18, 1998

[54] METHOD OF CONTROLLING A CONTINUOUSLY VARIABLE TRANSMISSION

[75] Inventors: Patrick Speicher, Oberteuringen; Ralf Vorndran, Bodolz, both of Germany

[73] Assignee: ZF Friedrichshafen AG, Friedrichshafen, Germany

[21] Appl. No.: 793,309

[22] PCT Filed: Sep. 8, 1995

[86] PCT No.: PCT/EP95/03528

§ 371 Date: Mar. 12, 1997

§ 102(e) Date: Mar. 12, 1997

[87] PCT Pub. No.: WO96/08664

PCT Pub. Date: Mar. 21, 1996

[30] Foreign Application Priority Data

Sep. 14, 1994 [DE] Germany ............... 44 32 678.5

[51] Int. Cl.$^6$ .................................................. B60K 41/14
[52] U.S. Cl. ............................ 477/48; 477/46; 477/47
[58] Field of Search ..................... 477/37, 41, 46, 477/47, 48; 701/55, 56, 58

[56] References Cited

U.S. PATENT DOCUMENTS

| 4,875,892 | 10/1989 | Sueda ................................ 477/46 |
|---|---|---|
| 4,945,483 | 7/1990 | Tokoro. |
| 5,007,147 | 4/1991 | Imai et al.. |
| 5,022,285 | 6/1991 | Suzuki ................................ 477/48 |
| 5,545,106 | 8/1996 | Senger et al. ..................... 477/48 |
| 5,600,557 | 2/1997 | Ogawa ............................... 477/37 |

FOREIGN PATENT DOCUMENTS

| 39 02 692 A1 | 8/1989 | Germany. |
|---|---|---|
| 41 20 546 A1 | 12/1992 | Germany. |
| 43 12 415 A1 | 10/1994 | Germany. |
| 44 25 528 A1 | 4/1995 | Germany. |

OTHER PUBLICATIONS

Abromeit, G. "Konzept einer elektronischen Steuerung für ein stufenloses mechanisches Getriebe", Antriebstechnik 24 (1985) Nr. 2, pp. 49–51.

*Primary Examiner*—Rodney H. Bonck
*Assistant Examiner*—Sherry Lynn Estremsky
*Attorney, Agent, or Firm*—Davis and Bujold

[57] ABSTRACT

A method of controlling an electronically controlled, continuously variable transmission (3), according to which an electronic control device (15) determines a parameter K1 (24) on the basis of input variables, for example driving activity and topography. The parameter K1 (24) brings about a variation of an operating point.

5 Claims, 2 Drawing Sheets

METHOD OF CONTROLLING A CONTINUOUSLY VARIABLE TRANSMISSION

BACKGROUND OF THE INVENTION

The invention relates to a method of controlling an electronically controlled, continuously variable transmission. Here an electronic control device establishes the operating point of the continuously variable transmission on the basis of input variables.

Continuously variable transmissions have a first pair of tapered discs on an input shaft and a second pair of tapered discs on an output shaft. Each pair of tapered discs consists of a first disc, stationary in an axial direction, and a second disc, movable in an axial direction. Between the pairs of tapered discs extends a belt-drive member such as a sliding jointed band.

In an electronically controlled, continuously variable transmission disclosed in Antriebstechnik 24 (1985) No. 2, it is possible by means of a programmed selector switch to shift between a first economy operating mode and a second sport operating mode. In the first operating mode, a ratio of the continuously variable transmission is adjusted so that the operating point of an internal combustion engine, which drives the continuously variable transmission, is passed into the performance graph of the internal combustion engine through the islands of the least specific consumption. In the second mode of operation, the ratio of the continuously variable transmission is adjusted so that the internal combustion engine generates a maximum torque or a maximum performance.

DE-A-41 20 546 has disclosed a method of controlling a continuously variable transmission of a motor vehicle. In this control method, the range between consumption and performance is gradually covered by five characteristic lines. A characteristic line is selected on the basis of driving activity. The disadvantage in this solution is that in many cases it is insufficient.

BRIEF SUMMARY OF THE INVENTION

The invention is based on the problem of providing an operating strategy for a continuously variable transmission.

According to the invention, a first solution of the problem resides in establishing the operating point by a performance graph which constitutes a dependence of the speed of the first tapered-disc pair on a throttle valve position, a vehicle speed and a parameter K1.

According to the invention, a second solution of the problem resides in establishing the operating point by a performance graph which represents a dependence of a ratio iV on a throttle valve position, a vehicle speed and a parameter K1. The reduction ratio iV results from the quotients of the speeds of the first tapered-disc pair by the second tapered-disc pair.

Operating point is to be understood, according to the invention, as a standard value of the speed of the first tapered-disc pair to be reached or of the ratio iV to be reached.

In a development of both the first and the second solutions, it is proposed that as the values of the parameter K1 rise, the operating point is continuously moved to a higher speed value of the first tapered-disc pair or a greater ratio iV. As the values of the parameter K1 drop, the operating point is continuously moved to a lower speed value of the first tapered-disc pair or a smaller ratio iV. This solution offers the advantage that it is possible to adjust any operating point as desired. In a continuous curve of the parameter K1, the transition from an old operating point to a new operating point likewise occurs continuously. Thus no speed steps occur which, in turn, results in an improved driveability.

In a development of this, it is proposed that the electronic control device determines the parameter K1 from the input variables, said parameter K1 representing an operating condition and each operating condition being reproduced at a value of the parameter K1.

In another development, it is proposed that the parameter K1 be capable of assuming any discrete values between zero and two. At a parameter K1 value of zero, an optimum consumption is adjusted. At a value of one, an optimum maximum performance presettable by a driver on the basis, for example, of a driving activity, is adjusted. At a value of two, the maximum braking effect of the engine or the maximum performance of an internal combustion engine, is adjusted. This solution offers the advantage that increased tractional resistance resulting, for example, from an uphill gradient or an increased weight due to a trailer, leads to a higher value of the parameter K1. This, in turn, produces the correction of the operating point of the internal combustion engine to higher speed values or of the ratio iV of the continuously variable transmission to higher values in the sense of a downshift. The effect of the increased tractional resistance is compensated hereby. The driver thus is not compelled to adjust to a higher value of the throttle valve. Another advantage of the solution consists in that when driving downhill, for example, the operating point likewise is corrected to higher speed values of the internal combustion engine based on a higher value of the parameter K1. Hereby the engine braking effect of the internal combustion engine is utilized.

DETAILED DESCRIPTION OF THE INVENTION

Figure 1:
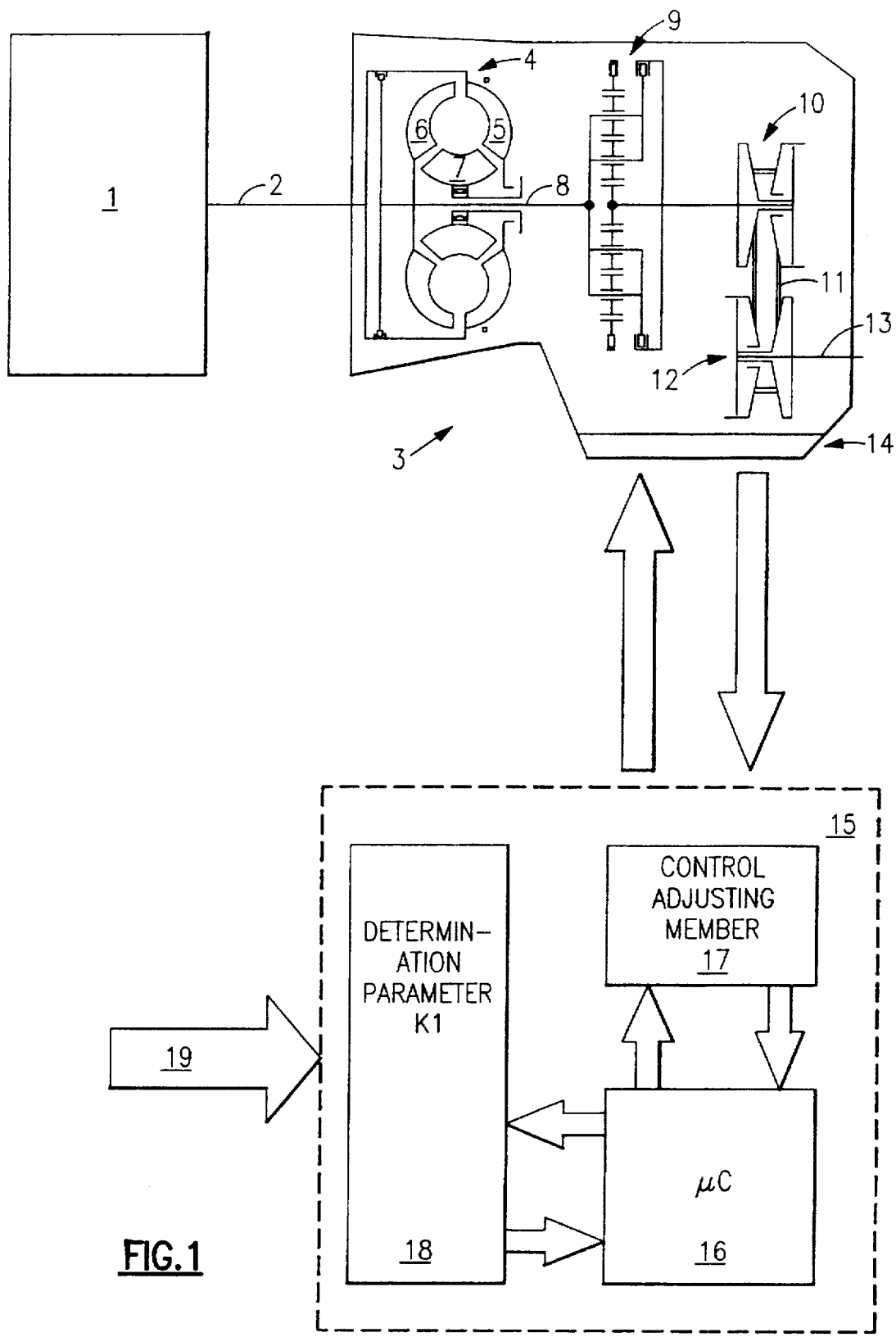
FIG. 1 is a block diagram of an electronically controlled, continuously variable transmission.

FIG. 1 shows a continuously variable transmission 3. The continuously variable transmission 3 is connected by an input shaft 2 with an internal combustion engine 1. The continuously variable transmission 3 is an assembly consisting of: a hydrodynamic converter with bridge clutch 4; a reversing set 9; a first tapered-disc pair 10; a second tapered-disc pair 12; a belt-drive member 11; and a hydraulic control device 14. The input shaft 2 drives the hydrodynamic converter 4. The latter consists, as it is known, of an impeller 5, a turbine wheel 6 and a stator wheel 7. As shown in FIG. 1, a converter bridge clutch is located in the hydrodynamic converter 4. The turbine wheel 6 or the converter bridge clutch is connected with a transmission input shaft 8. The input shaft 8 drives the reversing set 9. The rotational speed of the transmission input shaft 8 is transmitted to the first tapered-disc pair 10 via the reversing set 9 either directly or in a reverse rotational direction, for reverse driving. The core of the continuously variable transmission 3 is the first tapered-disc pair 10, the second tapered-disc pair 12 and the belt-drive member 11. Each tapered-disc pair is known to consist of a first tapered disc, stationary in an axial direction, and a second tapered disc, movable in axial direction. The belt-drive member 11, such as a sliding jointed band, extends between said tapered-disc pairs 10 and 12. As a result of the axial mobility of the second tapered-disc pair, the moving radius of the belt-drive member 11 changes and thus the speed of the transmission input shaft 8 and the ratio of the continuously variable transmission 3. The output is effected by the output shaft 13. The continuously variable transmission 3 is controlled by an electronic control device 15 by means of electromagnetic adjusting elements. The clutches and brakes or the pressure curve thereof are controlled by the electromagnetic adjusting elements not shown. The electromagnetic adjusting elements are in the hydraulic control device 14. Shown as blocks, the electronic control device 15 includes: a micro-controller 16, a function block control adjusting member 17 and a function block determining parameter K1 18. Input variables 19 are received by the electronic control device 15. The input variables 19 are, for example, a signal of a throttle valve position, a signal of a driving speed, a speed of the transmission input shaft, a speed of the output shaft, a temperature of the hydraulic medium and a driving activity.

Figure 2:
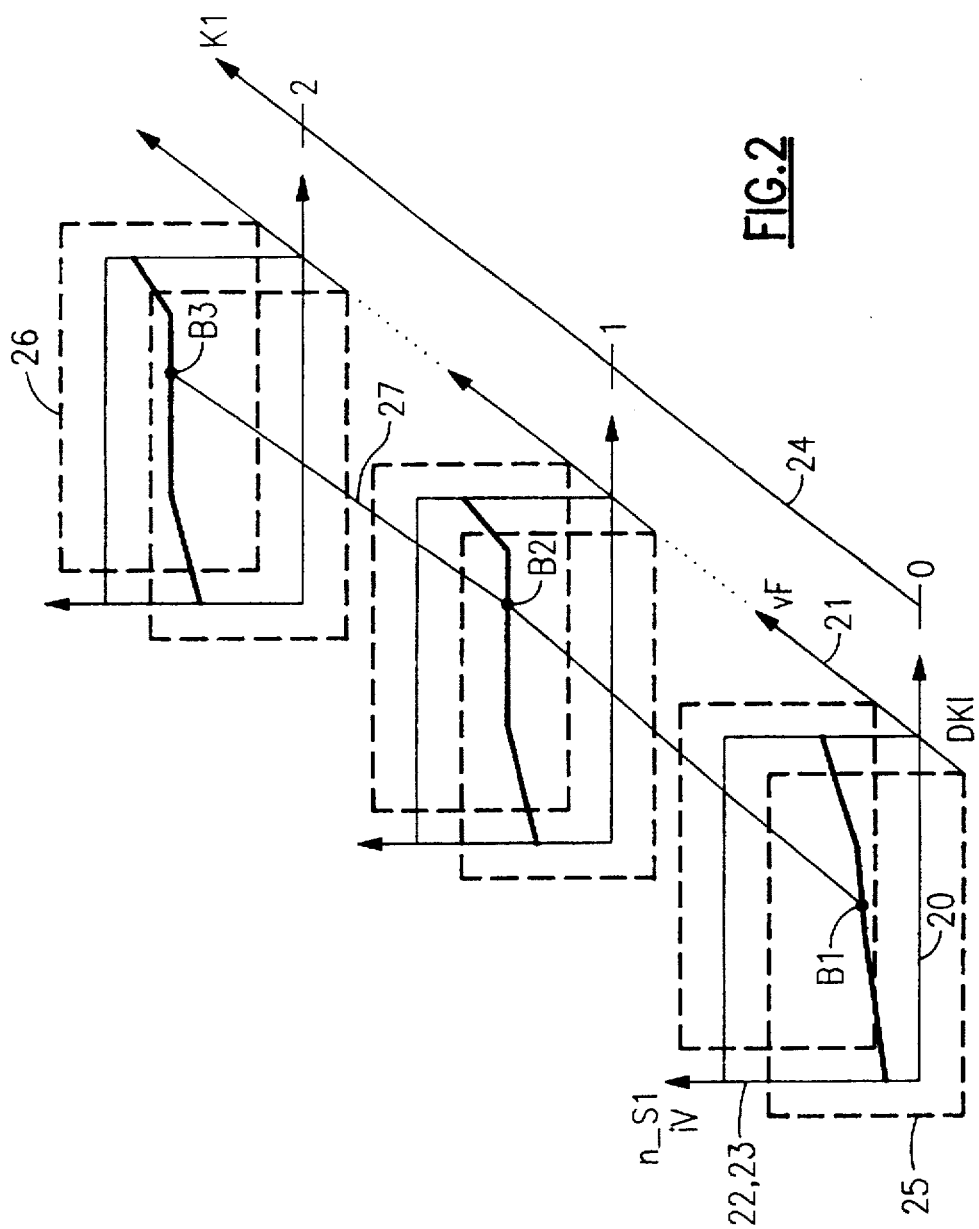
FIG. 2 is an operating performance graph.

FIG. 2 shows an operating performance graph of a continuously variable transmission 3. The value of a throttle valve position 20, the value of a vehicle speed 21 and the value of a parameter K1 24 are input variables for the operating performance graph. A speed of the first tapered-disc pair 22, or a ratio iV 23, is an output variable of the operating performance graph. The ratio iV results from the quotients of the speeds of the first tapered-disc pair by the second tapered-disc pair. The reference numeral 25 shows a first performance graph and the reference numeral 26 a n-th performance graph. The parameter K1 24 can assume any desired discrete value between zero and two. At a value of zero, an optimum consumption is adjusted. At a value of one, an optimum maximum performance presettable by the driver based, for example, on a driving activity, is adjusted. At a value of two, the maximum engine braking effect or the maximum performance of the internal combustion engine 1 is adjusted. The parameter K1 24 represents an operating condition, each operating condition being reproduced at one value of the parameter K1 24. Increased tractional resistance, as a result of an uphill gradient or an increased weight due to a trailer, leads to an increased value of the parameter K1 24. The latter, in turn, causes a correction of the operating point of the internal combustion engine to higher speed values or of the ratio iV of the continuously variable transmission to higher values. The effect of the increased tractional resistance is compensated hereby. Operating point, in the sense of the invention, is to be understood as a standard value of the speed to be reached by the first tapered-disc pair 22 or of the ratio iV 23 to be reached. Said standard value thus determined is usually modified by an inserted filter and is passed to a regulator which accordingly modifies the speed or ratio of the tapered discs. As can be seen from FIG. 2, as the values of the parameter K1 24 rise, the operating point is moved to higher speed values of the first tapered-disc pair 22 or higher ratio iV 23 and inversely moved as the values of the parameter K1 24 drops. Any desired operating point can be adjusted. In a continuous curve of the parameter K1 24, a transition thus occurs likewise continuously from an old operating point to a new operating point. In FIG. 2, for example, along the line 27 B1/B2/B3.

The course of the process is, for example, as follows: Based on the driving activity, a K1 value of 0.8 results. If the vehicle ascends a mountain, the value K1 rises steadily to a value of 1.5, for example, due to the tractional resistance. Therefore, the operating point is correspondingly adjusted higher.

Reference numerals

| | | | |
|---|---|---|---|
| 1 | internal combustion engine | 15 | electronic control device |
| 2 | input shaft | 16 | micro-controller |
| 3 | continuously variable transmission | 17 | function block control adjusting member |
| 4 | hydrodynamic converter with bridge clutch | 18 | function block determining parameter K1 |
| 5 | impeller | 19 | input variable |
| 6 | turbine wheel | 20 | throttle valve position |
| 7 | stator wheel | 21 | vehicle speed |
| 8 | transmission input shaft | 22 | speed of first tapered-disc pair |
| 9 | reversing set | 23 | ratio iV |
| 10 | first tapered-disc pair | 24 | parameter K1 |
| 11 | belt-drive member | 25 | first performance graph |
| 12 | second tapered-disc pair | 26 | n-th performance graph |
| 13 | output shaft | 27 | line B1/B2/B3 |
| 14 | hydraulic control device | | |

We claim:

1. A method of controlling an electronically controlled, continuously variable transmission (3) having a tapered-disc pair (10, 12) on both an input shaft and on an output shaft and a belt-drive member (11) being coupled between said tapered disc pairs, an electronic control device (15) which, on a basis of input variables (19), establishing an operating point of said continuously variable transmission by at least one characteristic line, said method comprising the steps of establishing said operating point by a performance graph (25, 26) which represents a dependence of the speed of said first tapered-disc pair (22) on a throttle valve position (20), a vehicle speed (21) and a parameter K1 (24) with said parameter K1 (24) being capable of assuming any discrete values between zero and two, and at a value of said parameter K1 (24) of zero a optimum consumption is adjusted, at a value of one a maximum performance optimum presettable by a driver is adjusted and at a value of two, a maximum engine braking effect or maximum performance of an internal combustion engine (1) is adjusted.

2. A method according to claim 1, further comprising the step of establishing said operating point via a performance graph (25, 26) which constitutes a dependence of a ratio iV (23) on a throttle valve position (20), a vehicle speed (21) and a parameter K1 (24), with a reduction in ratio iV resulting from a quotients of the speeds of said first tapered-disc pair and said second tapered-disc pair (10, 12), and said parameter K1 (24) assuming any desired discrete value between zero and two with said parameter K1 (24) being set at a value of zero for an optimum consumption, said parameter K1 (24) being set at a value of one for an optimum maximum performance which is presettable by a driver, and said parameter K1 (24) being set at a value of two for one of the maximum engine braking effect and the maximum performance of an internal combustion engine (1).

3. A method according to claim 1, further comprising the step of continuously moving the operating point to one of a higher speed value of said first tapered-disc pair (22) and a higher ratio iV (23), as the value of said parameter K1 (24) increases, and continuously moving the operating point to one of a lower speed value of said first tapered-disc pair (22) and a lower ratio iV (23), as the value of said parameter K1 (24) decreases.

4. A method according to claim 3, further comprising the step of determining, with said electronic control device (15), from the input variables (19) the parameter K1 (24) which represents an operating condition and reproducing each operating condition for a value of said parameter K1 (24).

5. An electronically controlled, continuously variable transmission (3) having a tapered-disc pair (10, 12) on both an input shaft and on an output shaft and a belt-drive member (11) being coupled between said tapered disc pairs, an electronic control device (15) which, on a basis of input variables (19), establishes an operating point of said continuously variable transmission by at least one characteristic line, and control means controlling said operating point by a performance graph (25, 26) which represents a dependence of the speed of said first tapered-disc pair (22) on a throttle valve position (20), a vehicle speed (21) and a parameter K1 (24) with said parameter K1 (24) being capable of assuming any discrete values between zero and two, and at a value of said parameter K1 (24) of zero a optimum consumption is adjusted, at a value of one a maximum performance optimum presettable by a driver is adjusted and at a value of two, a maximum engine braking effect or maximum performance of an internal combustion engine (1) is adjusted.

\* \* \* \* \*